(12) United States Patent
Clough

(10) Patent No.: US 6,168,886 B1
(45) Date of Patent: *Jan. 2, 2001

(54) BATTERY ELEMENT CONTAINING METAL MACROPOROUS ADDITIVES

(75) Inventor: Thomas J. Clough, Grover Beach, CA (US)

(73) Assignee: Ensci Inc, Pismo Beach, CA (US)

(*) Notice: Under 35 U.S.C. 154(b), the term of this patent shall be extended for 0 days.

This patent is subject to a terminal disclaimer.

(21) Appl. No.: 09/167,308

(22) Filed: Oct. 6, 1998

Related U.S. Application Data

(60) Continuation-in-part of application No. 09/045,726, filed on Mar. 20, 1998, which is a division of application No. 08/675,395, filed on Jul. 2, 1996, now Pat. No. 5,759,716.

(51) Int. Cl.⁷ .................................................. H01M 4/60
(52) U.S. Cl. ........................ 429/215; 429/204; 429/212; 429/225; 429/248; 429/249
(58) Field of Search ..................................... 429/215, 204, 429/212, 225, 248, 249

(56) References Cited

U.S. PATENT DOCUMENTS

| 5,221,587 | | 6/1993 | Böhnstedt et al. ................. 429/145 |
| 5,281,631 | * | 1/1994 | Horwitz et al. ....................... 521/38 |
| 5,759,716 | * | 6/1998 | Clough ............................... 429/215 |
| 5,895,732 | * | 4/1999 | Clough ............................... 429/204 |

FOREIGN PATENT DOCUMENTS 2440085  6/1980  (FR).

* cited by examiner

*Primary Examiner*—Laura Weiner
(74) *Attorney, Agent, or Firm*—Frank J. Uxa

(57) ABSTRACT

A battery element of a lead acid battery including a negative plate, a positive plate and a separator having a macroporous high cross-link organic polymer having sulfonic functionality in at least one of the negative plate or separator to improve capacity maintenance.

34 Claims, No Drawings

BATTERY ELEMENT CONTAINING METAL MACROPOROUS ADDITIVES

RELATED APPLICATIONS

This application is a continuation in part of application Ser. No. 09/045,726 filed Mar. 20, 1998, which application is a divisional application of application Ser. No. 08/675,395, filed Jul. 2, 1996, now U.S. Pat. No. 5,759,716. This earlier filed application is incorporated in its entirety herein by reference.

BACKGROUND OF THE INVENTION

The present invention relates to an improved lead acid battery element containing metal impurity inhibiting macroporous high crosslinked polymeric additives having sulfonic groups which are added to the positive active material, negative active material and/or battery separator to inhibit the detrimental effects of certain metals on the efficiency of a lead acid battery, particularly the negative plate battery element and to macroporous additives that enhance active material utilization efficiency and improvement in the utilization of sulfuric acid electrolyte necessary for the discharge reaction of a lead acid battery.

Further, the present invention relates to the use of an acid resistant expander functioning amount of a macroporous high cross-linked organic polymer having sulfonic groups in the negative plate of a lead acid battery. Further, the present invention relates to the use of acid resistant macroporous high cross-linked organic polymers having sulfonic groups in combination with the negative active material and an expander in the negative plate of a lead acid battery. The acid resistant macroporous organic polymer additives improve overall capacity maintenance.

Metal impurities can be introduced into a lead acid battery through the use of any of the materials used in the manufacture of the battery. For example, metal impurities can be introduced in the lead and leady oxides used in the manufacture of the active material, the materials of construction including the lead grids, alloying agents, electrolyte and water. Nearly all metallic impurities, if they are nobler than lead, have a 15 smaller hydrogen overvoltage than pure lead. Therefore, they increase hydrogen evolution even if they are deposited in minute concentrations on the surface of the negative plates. These metals cause a continued gas evolution even after charging is completed. Hydrogen is evolved on the deposited metal with low hydrogen overvoltage, which can be short-circuited with lead. The effect of metal on the gassing particularly postcharge gassing decreases in the following sequence: Pt,Au, Te, Ni, Co, Fe, Cu, Sb, Ag, Bi and Sn. The presence of 0.3 ppm of platinum in the acid can cause a doubling of the self-discharge rate. Tin can produce this effect at 0.1%. Freshly deposited antimony is especially active. Besides the discharge of the negative plates with concomitant hydrogen evolution, these materials also move the end of charge voltage of the negative plates toward more positive values. The hydrogen evolution increases with rising acid density. Because the hydrogen overvoltage decreases with temperature,the self-discharge increases. In addition, antimony is often added to grid lead in order to make the lead more fluid and more easily cast into the shapes necessary for storage battery grids.

Further, it also hardens the resulting casting so that it can be further processed in the plant without damage. In certain battery applications, it may be necessary for the battery to withstand extreme resistance to corrosion of positive plate grids. In that event, higher antimony contents typically within the range of 4.5 to 6 percent are incorporated into the grid to form a lead antimony alloy. Antimony in these concentrations are generally only used in positive grids particularly grids intended for corrosion resistant batteries. Corrosion resistance typically means the ability to withstand the destructive effects of excessive charge or overcharge.

Antimony in the grid metal produces a definite effect on the charge voltage characteristics of the fully charged wet battery. The higher the antimony percentage in the grid metal, the lower the charge voltage and conversely,as the antimony is decreased so the charge voltage increases until pure lead is attained, which produces the highest voltage on charge. Since the use of antimony has gradually been lowered from a maximum of about 12.0% to a maximum of about 6.0% antimony, the charge voltage of average batteries has increased.

Contaminant metals, hereinafter referred to as metal impurities including antimony from the positive grids, during service life, slowly goes into solution in the sulfuric acid electrolyte and from there it is believed to electroplate onto the surface of the negative plates. Once there, it acts as an additional electrode with the grid and the lead active material of the negative plates. This combination creates local action, promoting self-discharge contributes to poor wet battery shelf life. In addition, the battery's charge voltage slowly decreases during life and, in the voltage regulated electrical circuit of a car,the difference between the two becomes greater. The car voltage regulator is set at a voltage just slightly higher than the normal charge voltage of the battery. Thus, the generator is able to restore electrical energyto the battery, as needed, to keep it charged. With metal deposition and the lowering of the battery charge voltage,the generator output into the battery increases as an overcharge, which hastens the deterioration of the battery in service, until failure occurs. Therefore, it is very desirable to inhibit the detrimental effects of antimony on the negative plate.

SUMMARY OF THE INVENTION

A new battery element which inhibits the detrimental effect of soluble metal impurity on the negative plate has been discovered. In brief, the battery elements include the addition of certain high crossed-linked organic polymer having sulfonic functional groups with a preferential affinity for the metal impurity in the cation state, to the active material preferably, the negative active material or the separator which separates the positive and negative plates within a lead acid battery and which typically is a reservoir for sulfuric acid electrolyte.

A new battery element which improves utilization efficiency of the active material in a lead acid battery has been discovered. In brief, the battery elements include the addition of macroporous containing particle additives to the active material in the positive or negative plates of a lead acid battery to improve overall utilization efficiency and the utilization of sulfuric acid electrolyte during discharge of the battery.

A new battery element which improves capacity maintenance of the negative active material in a lead acid battery has been discovered. In brief, the battery elements include the addition of an acid resistant macroporous high cross linked organic polymers having sulfonic groups associated with said polymer which functions with an expander in the negative active material to improve overall capacity maintenance. Further, the organic polymer having sulfonic groups can function cooperatively with one or more components of the expander in the negative active material to improve overall capacity maintenance.

DETAILED DESCRIPTION OF THE INVENTION

In one broad aspect, the present battery elements comprise the addition of high cross-linked macroporous organic polymers containing sulfonic functional groups which are added to the active material, preferably negative active material, and/or the battery separator to inhibit the detrimental effects of certain metals on the efficiency of a lead acid battery.

In another broad aspect, the present battery elements comprise the addition of marcoporous high crossed-linked organic polymers containing sulfonic functional groups to the negative active material having at least one expander component. In a further preferred embodiment, the organic polymers are macroporous high crossed-linked and have sulfonic functionality on both the outer surface and within the internal pore structure. The above organic polymers can function together with at least one expander component present in the negative active material to improve overall battery capacity maintenance.

In lead acid batteries an expander is added in small amounts to the negative active material and its primary function is to prevent the contraction and solidification of the spongy lead of the negative plate. The contraction, orthe closing of the pores, in the negative plate can greatly reduce the capacity and the life of the negative plate and battery. Expanders are typically acid resistant materials which are able to function in the presence of sulfuric acid electrolyte.

Expanders typically consist of an intimate mixture of barium sulfate, carbon or lamp black and a ligneous material often derived from wood. The expander promotes good battery performance, i.e., capacity maintenance, particularly in the areas of low temperature and high rate discharge capacity and for extended negative plate life. Although the exact mechanism of the expander has not been quantitatively determined, it is believed that each of the additives has certain functions in the negative plate. For example, it is believed that barium sulfate which morphologically resembles lead sulfate, allows the lead sulfate formed during discharge conditions to attach itself to the barium sulfate and therefore prevent or reduce fusion. Further, it is believed that carbon being moderately electrically conductive assists in the formation process. Lastly, it is believed that the lignin sulfonic acid, including its synthetically derived anologs, somehow changes the crystal growth of the lead sulfate during discharge so that the lead sulfate does not form a continues film over the surface of the lead. It is believed that it allows for a discontinuous structure allowing for continued lead to contact sulfuric acid electrolyte for continued reaction and the production of electrical energy.

As set forth above, the surface of the spongy lead in the negative plate during discharge can be covered uniformly by the lead sulfate layer which has very limited solubility. As a result, an over saturated solution formed near the electrode surface with lead sulfate can pacifate the spongy lead during discharge and reducing the overall capacity of the battery. The lead sulfate can deposit as a very impenetrable film that results in fusion or sintering of the negative active material. The function of the expanders is to regenerate the essential pore structure and to prevent shrinkage responsible for the excessive capacity loss of the negative plate. One of the most important parts of the expander is the organic expander. The commercial expander of choice is a sulfonate derivative of lignin including such trade names as Vanisperse, Manisperse, Maracel, Lignosol, Reax,Vanine and Indulin. In general, the sulfonate derivatives of lignin and their synthetic organic anologs, have surfactant properties which allow the lignin derivative to be absorbed on the spongy lead as well as on the surface of the lead sulfate crystals formed during discharge. In both cases it is believed that the crystal growth is inhibited by the expander during the dissolution-precipitation process. Without organic expander, the discharge process produces new centers of crystallization for lead sulfate on the free sites of the lead metal until all the surface is covered by a of the lead metal until all the surface is covered by a thick sulfate layer. It has been shown, that without an organic expander, particularly, for an example, the sulfonate derivatives of lignin or their equivalent, that the lead crystals become quite large in diameter, i.e. a coarsening which are covered by the lead sulfate product. The result on the negative plate is low capacity and poor cycle life. It is believed that the organic expander functions to allow the formation of smaller and more loosely packed lead crystalsand that the morphology is changed. Thus, crystallization of the lead sulfate does not occur primarily on the lead metal, but on a layer of the organic lignosulfonate type particles and is more loosely connected with the lead surface, i.e., allowing continued reaction of the spongy lead during anodic discharge.

One of the problems associated with capacity maintenance of the negative plate in a lead acid battery, is the gradual deterioration of the organic expander, i.e.,sulfonate derived lignins or their synthetic anologs, during the cycle life of the battery particularly at elevated temperatures. It is believed that the organic expander gradually solubilizes in the sulfuric acid electrolyte and is oxidatively degraded after solubilization. Further, it is believed that the initial acid resistant lignosulfonate can gradually be subjected to oxidative and thermal degradation, particularly in the presence of catilytically active metals. As set forth above, the pores of the negative plate can close and the specific surface area can decrease as the microstructure 15 of the negative platechanges. It has been found that such changes occur more rapidly at higher temperatures such as from 40 to 80° C. Thus, temperatures as high as 80° C. or even higher are being found in engine compartments for automobiles using lead acid starting batteries. It has been observed that the organic expander in contrast to the typical inorganic expander components, deteriorate more rapidly through the degradation process as the temperature increases. The deterioration of the organic expander results in a reduction in high rate capacity particularly at low temperature and capacitymaintenance during the repetitive charge/discharge cycles over the life of the battery.

As set forth above, it has been found that macroporous high crossed-linked organic polymer containing sulfonic functional groups provide for improved capacity maintenance of the negative plate having negative active material with at least one expander component. Further, it has been found that such organic polymer, having sulfonic functional groups, improves the overall oxidative and/or thermal stability properties of the organic expander, for example, the sulfonate derived lignins or their synthetic anologs, particularly as the temperature of the battery environment increases. Further, the organic polymer can replace at least a part of the organic expander in an expander having barium sulfate, optionally with carbon.

In another broad aspect, the present battery elements comprise the addition of an organic polymer containing functional groups with a preferential affinity for metal impurity in the cation or anion state to the positive active material, the negative active material and/or the separator which separates the positive plates from the negative plates in a lead acid battery. In a preferred embodiment, the organic polymers are porous, i.e. the porosity of the polymer allows the soluble metal impurity in the electrolyte to contact both the outer surface of the polymers and the internal surfaces created by the porosity of the organic polymers. The functional groups having a preferential affinity for metal impurity include both functional groups on the outer surface and internal surfaces in contact with soluble metal impurity in the electrolyte. The metal impurity inhibiting additives are typically incorporated into the negative active material, 30 the positive active material and/or the separator in an amount sufficient to inhibit the detrimental effects of metal impurity on the negative plate.

In another broad aspect, the present battery elements comprise the addition of macroporous additives to the active material present in the positive and/or negative plates in a lead acid battery. In a further preferred embodiment, the macroporous particles have a reduced affinity for bonding with the active material in the positive and negative plates.

As set forth above, metal impurities can be introduced into the battery during the battery manufacturing process, particularly in the starting materials used for battery manufacture. Many of the metal impurities can exist in the anion or cation form i.e. a negative or positive charge respectively in sulfate solutions such as that represented by sulfuric acid electrolyte. Depending on the molarity of the sulfuric acid electrolyte and the metal impurity, such cation/anion forms can change as the molarity changes. Depending on such sulfuric acid molarity, it is believed that platinum, gold, thallium, nickel, cobalt, iron, copper, antimony, silver, bismuth and tin can exist as anions even though such existence as anions may be weak or unstable. Further, such anion forms may predominant at the sulfuric acid electrolyte concentrations which exist after battery charging. One of the particularly detrimental metal impurities is platinum.

As set forth above, such metal impurities can be introduced into the lead acid battery during manufacturing. In a number of battery designs, grid materials not having antimony as an alloying agent are used for battery manufacture. However, even in these types of batteries using nonantimony containing grids, antimony can be introduced as an impurity in the starting materials for battery manufacture including the starting lead and leady oxide type materials.

As set forth above, antimony which is present in the positive grid as an alloying agent can be oxidized and/or corroded to form a soluble antimony ion which diffuses and/or migrates to the negative plate. Antimony at the negative plate can produce a number of detrimental problems such as self discharge and gassing particularly hydrogen formation. Antimony ion from the positive grid can exist in both the anion and cation form, i.e. a negative or positive charge respectively. It is believed that the form of the anion or cation is dependent on the oxidation state of the antimony, i.e. +3 or +5, the molarity of the sulfuric acid and the battery voltage. For example, it is believed that antimony can exist as $SbO2+$ cation and $SbO3-$ anion in the antimony +5 state and as $SbOSO4-$, $Sb(SO4)^{2-}$ $SbO2$ in the antimony +3 state. These +3 anion forms are believed to exist when the molarity of the sulfuric acid is greater than one but may not exist at the fully recharged battery voltage. In addition, it is believed that antimony may exist as $Sb+3$ or $SbO+$ in the antimony +3 state again depending on molarity and battery voltage. As set forth above, the sulfuric acid electrolyte participates in the discharge reactions taking place in the lead acid battery. Thus, the wt% sulfuric acid can decrease from 30–40 wt % sulfuric acid to from 10–14 wt % sulfuric acid depending on the type of battery design and the initial sulfuric acid concentration in the electrolyte. The amount of sulfuric acid remaining will be dependent on the percent of discharge of the battery with less sulfuric acid remaining when batteries are discharged to 80% or more.

The organic polymers having functional groups with a preferential affinity for metal impurities in the anion or cation state inhibit the detrimental effects of soluble metal impurity on the negative plate. While the exact mechanism of inhibition is not known, it is believed that the metal impurity anion or cation is bound by the functional group such as by the anion replacing the anion present on the functional group in an anionic polymer or by a cation replacing the cation when the organic polymer contains cation functional groups. Although anion and/or cation replacement is believed to be one mechanism for inhibiting the adverse effects of metal impurity ions, metal impurities can also form complexes and/or be solvated to inhibit the detrimental effect of metal impurities on the negative plate and such mechanisms are included in then the term inhibiting. One of the major discoveries of the battery elements of this invention is the inhibition of metal impurities over the varying sulfuric acid molarities and battery potentials (voltages) that occur during the charge discharge reactions in a lead acid battery. Further it has been discovered that the metal impurity which has been inhibited by the organic polymer additive is not substantially and detrimentally desorbed and/or released from the polymer under the sulfuric acid molarity and battery voltage conditions and changes in a lead acid battery, that is the metal impurity inhibition continues during a plurality of charge/discharge reactions within the battery.

As set forth above, the organic polymers containing functional groups can introduce cations and/or anions into the battery element which cations or anions can be displaced by the metal impurity anion and/or cation. Further, the affinity of the organic polymer having such metal impurity inhibiting functional groups have a stronger binding and/or complex formation and/or solvation of metal impurity ions when compared to any intermediate soluble lead ions such as lead +2 which may be formed during the conversion of solid lead, solid lead peroxide to insoluble lead sulfate. As is known by those having skill within the lead acid battery art, cations and/or anions which are displaced by metal impurity cations or anions should not introduce any substantial detrimental effects on battery performance.

As set forth above, one of the classes of organic polymers has functionality which have affinity for metal impurity in the cation form. The metal impurity cation displaces the cation associated with the functional group, Typically, the cation displaced can be hydrogen ion or, for example, sodium ion. The organic polymers having such cation functionality can be further classified as strongly acidic cation polymers or weakly acidic cation polymers. Particularly preferred strongly acidic cation polymers are those containing sulfonic acid groups or their sodium salt i.e. sulfonic groups preferably in the hydrogen form. Typical examples of polymers containing the sulfonic acid and/or sulfonate functionality are those derived from polystyrene crosslinked divinylbenzene, phenol-formaldehyde polymers and other like aromatic containing polymers.

A unique class of organic polymers which have been found to provide significant improvements in controlling the adverse effects of certain metal impurities and in improving capacity maintenance over the life of the battery are certain macroporous high cross-link organic polymers having sulfonic functional groups. The high cross-link organic polymers have from about 12 to about 25 wt % cross-link, more preferably from about 14 to about 22 wt % cross-link and still more preferably from about 16 to about 20 wt % cross-link basis divinyle benzene in polystyrene. The macroporous polymers, preferably have an average median pore size of from about 200 angstroms to about 2,000 angstroms, more preferably from about 250 angstroms to about 1,100 angstroms and still more preferably from about 300 angstroms to about 750 angstroms. The sulfonic groups either in the hydrogen or alkali metal form, preferably sodium, have been found to provide improved irreversible impurity metal binding at the acid molarities and varying potentials of the lead acid battery that occur during charge/discharge cycles. Without wishing to be bound by any particular theory, it is believed that the high cross-link macroporous polymers particularly within the average pore diameters as set forth above, allow for the ingress of the metal impurity ion into the interior of the porous polymer while severely limiting the egress of the metal ion from the interior of the porous polymer during changes in both the acid molarity and potential changes that occur during battery cycling. Thus, the high cross-link macroporous polymers allow for the improved and enhanced binding efficiency of the sulfonic functional groups under the above lead acid battery conditions.

The preferred high cross-link organic polymers are those derived from polystyrene cross-linked with divinylbenzene within the above wt% of cross-link, preferably from about 14 to 22 wt % cross-link, basis the wt % of divinylbenzene in the total cross-linked polystyrene polymer. Typical examples of preferred macroporous organic polymers are the sodium salt of a divinylbenzene 20% cross-linked polystyrene having sulfonic functional groups, a median pore diameter of 350 angstroms and a capacity of about 4.3 eq./kg basis dry resin, the sodium salt of a 16% divinylbenzene poylstyrene porous polymer having sulfonic function groups and a capacity of 5.0 eq./kg and having a median pore diameter of greater than 1,000 angstroms and the sodium salt of a 20% divinylbenzene cross-linked polystyrene having sulfonic functional groups and a capacity of 5.0 eq./kg and a median pore diameter of 650 angstroms and corresponding macroporous polymers of the types set forth above having increased sulfonic functional groups and capacity approaching 20% increase or more. Further, typical examples are the hydrogen form of the divinylbenzene cross-linked polystyrenes as set forth above.

In the applications as set forth herein, the high cross-linked organic polymers can have various moisture retentions typically ranging from about 35 to about 60 wt %.

In general, the moisture retention, i.e., of the polymer, can vary depending upon the application. Typical moisture levels for use in battery active material is from about 35 wt % to about 50 wt % moisture basis the total wt of the macroporous polymers. In separators for use in lead acid batteries it is preferred to have moisture levels less than about 15 wt % preferably less than 10 wt %, particularly when the separators are manufactured at elevated temperatures, such as the extrusion process for forming polyethylene separators, where retained moisture could volatize under such conditions of manufacturer.

The high cross-link, as set forth above, refers to the wt % of cross-link in the macroporous organic polymer. The basis of such wt %'s is the wt % of divinylbenzene in a total polystyrene polymer. For other high cross-linked polymers such as phenol formaldehyde high cross-linked polymers, the wt % of the cross-link from, for example, formaldehyde will be less on a wt % basis since the molecular of formaldehyde is significantly less than the molecular wt of divinylbenzene. For purposes of the term, high cross-link and the wt % of cross-link per total weight of the polymer as set forth above, the wt % of formaldehyde for purposes of the above ranges would be increased by multiplying such wt % by the product obtained by dividing the molecular wt of divinylbenzene by the molecular wt of the non-divinyl benzene cross-link.

As set forth above the organic polymer can have different functional groups such as functional groups containing strongly acidic functionality such as sulphonic and phosphonic functionality on the same organic polymer. As set forth above, strongly acidic cation polymers are preferred for inhibiting the effects of metal impurities. A particularly preferred functionality on the polymer is phosphonic acid and/or phosphonate here in after refered to as phosphonic functionality. Typical examples of such functionality are:

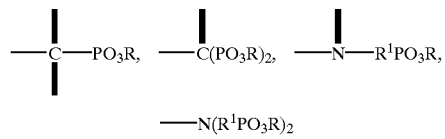

where R is typically hydrogen or sodium ion, preferably hydrogen and $R^1$ is alkylene, preferably methylene.

In general the phosphonic functionality can be incorporated into the polymer matrix by chemical reaction including grafting of such functionality, of for example the aromatic portion of polystyrene and/or phenol-formaldehyde polymers. In addition, the functionality can be incorporated by the copolymerization of unsaturated vinylmono or gem phosphonic acid or ester monomers with other monomers patricularly styrene, with still other monomers such as acrylate or acrylonitrile together with a cross-linking agent such as divinylbenzene. A typical monomer used for such copolymerization is vinylidene diphosphonic acid or the ester thereof to produce gem phosphonic functionality. Further examples of such polymers are polymers having a plurality of amino alkylene, phosphonic acid or phosphonate associated with the organic polymer.

As set forth above bis-derivatives are also useful including imino-bis(methylenephosphonic acid). The particularly preferred functionality is amino methylenephosphonic acid groups on polystyrene cross-linked with divinylbenzene.

As set forth above, phosphonic functionality can be incorporated into the polymer by reaction with an existing polymer matrix or by copolymerization of for example a vinyl phosphonic monomer. A prefered polymer is one containing polymerized styrene monomer either as a homo polymer or as an inter polymer with other polymerized monomeric units. Such polymers containg polymerized styrene as one of the monomers are generally referred to as polystyrene polymers.

As set forth above the organic polymer can have different functional groups such as functional groups containing strongly acidic functionality such as sulphonic and phosphonic functionality on the same organic polymer.

The organic polymers having phosphonic functionality can be combined with at least one component of an expander in the negative active material to provide improved maintenance of the lead acid batteries. Typical examples of the organic polymers having phosphonic functionality are set forth above.

The weakly acidic cation polymers in general have carboxylic functionality and/or the sodium salt associated with the organic polymer. Typical examples of such polymers are those derived from unsaturated carboxylic acids such as acrylic, methacrylic or maleic crosslinked with another monomer such as divinylbenzene or ethylene dimethacrylate. The preferred organic polymers containing cation functionality are the strongly acidic cation polymers having sulfonic acid functionality.

As set forth above, the organic polymer can have functionality having a preferential affinity for soluble metal impurity anions, i.e. the anion associated with the functionality is displaced by the soluble metal impurity anion in the electrolyte. The organic polymers having anion functionality can have both strongly basic and weakly basic anion functionality. Typical examples of strongly basic anion containing functionality are those having an ammonium functionality associated with the organic polymer. As set forth above, the anion associated with the functionality, typically sulfate or chloride, is displaced by the metal anion within the electrolyte. Typical ammonium groups associated with the polymer include trimethyl ammonium ion and dimethylethanol ammonium ion. Other groups include isothiouronium and derivatives thereof. Typical examples of organic polymers are polystyrene crosslinked with divinylbenzene. The ammonium ion with an appropriate anion can be attached directly to, for example, the aromatic ring of the polystyrene or through, for example, a methylene bridge. Typical examples of weakly basic polymers having anion functionality are polymers which contain tertiary aliphatic or aromatic aliphatic amine functionalities on the polymer such as polystyrene or a polyunsaturated carboxylic acids. Such polymers are typically crosslinked with a crosslinking agent such as the crosslinking agents referred to above. Further, the polymer basic anion functionality can be obtained through aliphatic polyamine condensation reactions to produce the organic polymer. Typically, the weak base anion resins contain primary, secondary and/or tertiary amine groups generally as a mixture. Typical examples of such amine groups are trimethyl amine and dimethylethanolamine. The preferred organic polymers having anion type functionality are the strongly basic anion containing functionality particularly for their strong binding and low release or desorption of metal impurity properties preferably having ammonium functionality, particularly for incorporation into the negative plates. Since the electrolyte in the lead acid battery is sulfuric acid, it is preferred to use sulfate as the anion to be displaced by metal anion.

As set forth above the organic polymers can contain primary, secondary or tertiary amine groups including aliphtaic polyamine functionality. Further as set forth above, such organic polymers can contain aliphatic amine functionality. Further, as set forth above such polymers can contain amine functionality with acid functionality. Particularly preferred functionalities associated with the organic polymer which contain both amine and acidic functionality are those containing secondary and tertiary amine functionality and strong acid functionality, such as for example, the examples set forth above.

A particularly preferred class of aliphatic aromatic amine functionality are those having amino pyridine groups associated with the organic polymer. Examples of such groups can be represented by the formula.

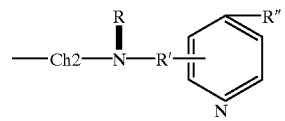

where in R is preferably an aliphatic substituent, an aliphatic polyamino substituent or a 2-picolene containing substituent, R' is preferably alkylene, preferably methylene and R" is a non-substantially interfering substituent, preferably hydrogen. Particularly preferred additives are organic polymers having functionality from 2-picolylamine, N-methly-2-picolylamine, N-2hydroxyethyl)-2-picolylamine, N-(2-methylaminoethyl)-2-picolylamine and bis-(2-picolyl)amine.

The aromatic aliphatic amine functionalities particularly the 2-picolylamine, such as bis-(2-picoly) amine, are particularly useful in inhibiting the detrimental effects of copper and nickel.

As set forth above the organic polymers can contain primary, secondary or tertiary amine groups including aliphtaic polyamine functionality. Further as set forth above, such organic polymers can contain aliphatic amine functionality. Further, as set forth above such polymers can contain amine functionality with acid functionality. Particularly preferred functionalities associated with the organic polymer which contain both amine and acidic functionality are those containing secondary and tertiary amine functionality and strong acid functionality, such as for example, the examples set forth above.

The organic polymers having functional groups with affinity for metal impurity are typically within the particle size ranges, porosities, surface areas, additive concentration and such other physical properties set forth below with respect to porosity additives. The porosity of the preferred organic polymers can vary over a wide range such as within the ranges set forth below with respect to micro and macro porosity. The porosity of the preferred organic polymers is that which allows the metal impurity ion, cation and/or anion to permeate the organic polymer particle thereby affording good contact with the functional groups attached to the external and internal surfaces of the particles. The total displacement capacity of the organic polymer having such functional groups is typically greater than one milliequivalent of displaceable anion or cation per gram of dry polymer, preferably greater than three and still more preferably greater than five.

The macroporous high cross-linked organic polymers have the wt % cross-link and the preferred median pore diameter as set forth above under high cross-linked organic polymers. The total displacement capacity for the high cross-link organic polymers is as set forth above.

Any suitable positive active electrode material or combination of such materials useful in lead-acid batteries may be employed in the present invention. The positive active electrode material can be prepared by conventional processes. For example, a positive active electrode material precursor paste of lead sulfate and litharge (PbO) in water can be used, or conventional pastes, such as those produced from leady oxide, sulfuric acid and water, can be used. After the paste is applied to the grid material, it is dried and cured. The precursor paste may be converted to lead dioxide by applying a charging potential to the paste.

Any suitable negative active electrode material useful in lead-acid batteries may be employed in the present invention. One particularly useful formed negative active electrode material comprises lead, e.g., sponge lead. Conventional lead paste prepared from leady oxide, sulfuric acid, water and suitable expanders can be used. A suitable expander material typically comprises an organic expander, barium sulfate and carbon black. Typically, the organic expander is a purified product in the form of a lignin sulfonic acid and is typically present at a concentration based upon the leady oxide used to form the active material of less than 2.0% typically less than 1.0 wt. %. The barium sulfate is typically a precipitated variety and is used as a lump-free powder having a particle size less than 45 microns. The barium sulfate is typically used at a concentration of less than 0.5 wt. % basis the dry leady oxide used for the paste manufacture. Lastly, the carbon black is typically a finely divided carbon substantially free from all oil or tar. Further, the carbon black must be wettable by sulfuric acid electrolyte. Typically, the carbon black is used at a concentration of less than 0.5 wt. % basis the drv leady oxide. The concentration of the expander having all components is generally in the range of from 1 to 3 wt. % basis dry leady oxide with the performance requirements of the battery being a factor in defining expander concentration in the negative plate.

Each of the cells of a lead acid battery further includes a non-electrically conductive separator acting to separate the positive and negative electrodes of the cell and to hold electrolyte. Any suitable material may be used as a separator provided that it has no substantial detrimental effect on the functioning of the cells or battery. Typical examples of separator material for batteries include glass fibre, sintered polyvinyl chloride and microporous polyethylene, which have very small pore sizes. Certain of these separators are formed as envelopes, with the pasted plates inside and the separatoredges sealed permanently. Typically only the positive plates are encased in the separator. Separators uses for sealed lead-acid batteries operating on the oxygen recombination principle,i.e., oxygen recombinant batteries include one or more layers of silica-based glass, preferably separators formed of a highly absorptive porous mat of acid wettable binder free microfine glass fibers. Typically, a mix of fibers may be employed whose individual fibers have an average diameter in the range of about 0.2 to about microns, more preferably about 0.4 25 to 5.0 microns, with possible minor amounts of larger gauge fibers to facilitate production of the mat. The porosity is preferably high, more preferably in the range of about 80% to about 98% and still more preferably about 85% to about 95%, if in the compressed state in the cell (slightly higher in the uncompressed state). The separator preferably has a relatively high surface area, more preferably in the range about 0.1 to about m2/g, which facilitates theabsorption and retention of relatively large amounts of acid electrolyte volumetrically while, if desired, still having a substantial unfilled pore volume permeable to oxygen for transport directly through the separator for consumption at the negative electrode. The particularly preferred separator materials have a surface area as measured by the BET method of in the range about 0.2 to about 3.0 m 2/g., especially about 1.0 to about 2.0 m 2/g.

As set forth above metal impurities are particularly detrimental in sealed lead acid batteries operating on the oxygen recombination principal, i.e. recombinant batteries. A number of impurity metals can exert a deleterious effect on the performance of recombinant batteries by for example, effecting one of more of the performance requirements of the recombinant batteries such as by increasing oxygen, evolution at the positive electrode, increasing hydrogen evolution at the negative electrode, inhibiting oxygen recombination at the negative electrode and in increasing the amount of water lost by the battery. Typical examples of metals that are particularly deleterious in recombinant batteries are arsenic, antimony, cobalt, chromium, nickel and tellurium.

As set forth above, the metal impurity inhibiting additives can be incorporated directly into the positive active material or negative active material for reducing the detrimental effects of the soluble metal impurity on the negative plates. Further, the metal impurity inhibiting additives, as set forth above, can be coated on the separator such as the glass fiber mats used in lead acid batteries. Further, the metal impurity inhibiting additives can be incorporated into the porous polymeric separators, such as polyvinyl chloride and microporous polyethylene.

In the manufacture of porous polymeric separators such as high molecular weight polyethylene, the additive can be blended with the polymer and other components such as silica and extractable solvents such as hexane and/or oil. The blend can be formed into separator sheets by conventional higher temperature processes such as extrusion processes. The extractable solvent can then be removed. The resulting separator has porosity to allow electrolyte to flow through the separator. The metal impurity inhibiting additives typically have moisture contents less than 15% and still more preferably less than 10 wt % when the additive will be exposed to elevated temperatures where water vapor can be generated and adversely effect the physical properties of the separator. The metal inhibiting additives are preferably hydrophilic in order that the additive particles are not substantially wet out by the polymeric materials that form the separator. The hydrophilic nature of the metal inhibiting additives, preferably as the sodium salt, allows the pores of the additive to be accessible to metal impurity containing electrolyte, i.e., the surfaces of the additive and the pores are not adversely bonded to the polymeric material of the separator. In addition, it is preferred to use the sodium form of the additive, since on an exposure to moisture and acid and ultimate conversion to the hydrogen form, the metal inhibiting additive will shrink to a certain degree thereby providing for enhanced accessibility of the impurity metal containing electrolyte to the pores of the metal inhibiting additive. Typical concentrations of the additives on a dry basis associated with the separator is less than about 15%, preferably less than about 10 wt % and still more preferably less than about 5 wt % basis the weight of the separators. The preferred metal impurity inhibiting additives are the porous organic polymers which allow for the inhibiting effect of the additives while not detrimentally adversely effecting the flow of electrolyte from and/or through the separator to the positive and negative plates.

In another broad aspect for manufacturing tin dioxide coated porous substrates, the process comprises contacting a porous substrate with a composition comprising a tin oxide precursor, such as tin chloride forming components, including stannic chloride, stannous chloride, tin complexes and mixtures thereof, preferably stannous chloride, at conditions, preferably substantially non-deleterious oxidizing conditions, more preferably in a substantially inert environment or atmosphere, effective to form a tin oxide precursor-containing coating, such as a stannous chloride-containing coating, on at least a portion of the substrate. The substrate is preferably also contacted with at least one dopant-forming component, such as at least one fluorine component, at conditions, preferably substantially non-deleterious oxidizing conditions, more preferably in a substantially inert atmosphere, effective to form a dopant-forming component-containing coating, on at least a portion of the substrate. The coated porous particles are particularly useful in a number of applications, particularly lead acid batteries,for example,monopolar and bipolar batteries, catalyst, resistance heating elements, electrostatic dissipation elements, electromagnetic interference shielding elements, electrostatic bleed elements, protective coatings, field dependent fluids and the like. In practice the particles which are preferred for use in such applications in general have an average length in the range of from about 20 microns to about 7 mm and an average thickness in the range of from about microns to about 7 mm, the average length and thickness being different or the same depending on particle geometry and application. As set forth above,the substrate can be optimized for a particular application and the particular electrical and/or mechanical requirements associated withsuch end use application. For example, in applications in which the particles are combined with other materials, such as polymers and positive active material of a lead acid battery and depending on the requirements of the application, ranges of from about 3 microns to about 300 microns, or even less than about 5 microns, typically ranges of from about 3 microns to about 150 microns or from about 5 microns to about 75 microns are useful. The porous inorganic substrates, can be characterized by bulk density (gm/cc)which is the weight or mass per unit volume considered only for the particle itself, i.e., includes the internal pore volume, surface area (M2/gm), total pore volume(cc (hg)/gm),pore size distribution and percent apparent porosity. In general, it is preferred that the bulk density be from about 3% to about 85% more preferably from about 10% to about 70%, more preferably, from about 10% to about 60% of the true density of the substrate material. Bulk densities less—than about 5% are also useful. In addition, the porous substrate can have a wide range of surface area (M2/gm) of from about 0.01 to about 700 preferably having a moderate to high surface area, preferably, from about 10 M2/gm to about 600 15 M2/gm, more preferably, from about 50 M2/gm to about 500 M2/gm.

The pore volume is preferably from about 0.4 cc/gm to about 3.5 cc/gm, oreven up to about 5 cc/gm, more preferably from about 0.7 cc/gm to about 4.5 cc/gm more preferably from about 0.7 cc/gm to about 3.25 cc/gm. The pore size distribution can vary over a wide range and can have various distributions including multi-modal, for example, bi-modadistribution of pores including macro pores and micro pores. There ideally exists a relationship between pore diameter, surface area and pore volume, thus fixing any two variables generally determines the third. In general, the mean (50%) pore diameter for macro pores, i.e., generally classified as having a pore diameter greater than about 750 angstroms can vary from about 0.075 microns to about 150 microns, more preferably, from about 0.075 microns to about 10 microns. Micro porosity, generally classified as a porosity having a mean pore diameter of less than about 750 angstroms can vary over a wide range. In 15general, the mean pore diameter for micro porosity can vary from about 20 angstroms to about 750 angstroms, more preferably, from about 70 angstroms to about 600 angstroms. The ratio of macro to micro porosity can vary over a wide range and depending on the application, can be varied to provide optimized performance as more fully set forth under the various applications. In general, the ratio of percent macro porosity to micro porosity expressed as that percent of the total porosity can vary from abaut 0% to about 95%, more preferably, from about 5% to about 80% macro porosity and from about 100% to about 5%, more preferably from about 95% to about 20% micro porosity.

As set forth above, the porous substrate can be inorganic for example, carbon and carbide, i.e., silicon carbide, sulfonated carbon and/or an inorganic oxide. Typical examples of inorganic oxides which are useful as substrates include for example, substrates containing one or more alumino silicate, silica, alumina, zirconia, magnesia,boria, phosphate, titania, ceria, thoria and the like,as well as multi-oxide type supports such as alumina phosphorous oxide, silica alumina, zeolite modified inorganic oxides, e.g., silica alumina, perovskites, spinels, aluminates, silicates e.g., zirconium silicate, mixtures thereof and the like. A particularly unique porous substrate is diatomite, a sedimentary rock composed of skeletal remains of single cell aquatic plants called diatoms typically comprising a major amount of silica. Diatoms are unicellular plants of microscopic size. There are many varieties that lives in both fresh water and salt water. The diatom extracts amorphous silica from the water building for itself what amounts to a strong shell with highly symmetrical perforations. Typically the cell walls exhibit lacework patterns of chambers and partitions, plates and apertures of great variety and complexity offering a wide selection of shapes. Since the total thickness of the cell wall is in the micron range, it results in an internal structure that is highly porous on a microscopic scale. Further, the actual solid portion. of the substrate occupies only from about 10–30% of the apparent volume leaving a highly porous material for access to liquid. The mean pore size diameter can vary over a wide range and includes macroporosity of from about 0.075 microns to 10 microns with typical micron size ranges being from about 0.5 microns to about 5 microns. As set forth above, the diatomite is generally amorphous and can develop crystalline character during calcination treatment of the diatomite. For purposes of this invention, diatomite as produced or after subject to treatment such as calcination are included within the term diatomite.

As set forth above, porous substrate particles can be in many forms and shapes, especially shapes which are not flat surfaces, i.e., non line-of-site materials such as pellets, extrudates, beads,including spheres, flakes, aggregates, rings, saddles, stars and the like. The percent apparent porosity, i.e., the volume of open pores expressed as a percentage of the external volume can vary over a wide range and in general, can vary from about 20% to about 92%,more preferably, from about 40% to about 90%. In practice,the bead particles, including spheres, which are preferred for use in certain applications in general have a roundness associated with such particles generally greater than about 70% still more preferably, greater than about 85% an still more preferably, greater than about 95%. The bead products of this invention offer particular advantages in many of such applications disclosed herein, including enhanced dispersion and rheology.

Acid resistant inorganic substrates, especially fibers, flakes, and glass fibers, are particularly useful substrates, when the substrate is to be used as a component of a battery, such as a lead-acid electrical energy storage battery.

The porous substrate for use in lead-acid batteries, because of availability, cost and performance considerations, generally comprises acid resistant glass, and/or ceramics more preferably in the form of particles, for example, fibers, and/or flakes, and/or beads including spheres and/or extrudates as noted above.

The solid substrates including organic polymers for use in lead-acid batteries are acid resistant. That is, the substrate exhibits some resistance to corrosion, erosion, oxidation and/or other forms of deterioration and/or degradation at the conditions present, e.g., at or near the positive plate, negative plate or positive or negative side of bipolar plates or separator, in a lead-acid battery. Thus, the substrate should itself have an inherent degree of acid resistance. If the substrate is acid resistant, the physical integrity and electrical effectiveness of the whole present battery element, is better maintained with time relative to a substrate having reduced acid resistance. If glass or ceramic is used as the substrate particle, it is preferred that the glass have an increased acid resistance relative to E-glass. Preferably, the acid resistant glass or ceramic substrate 5 is at least as resistant as is C-or Tglass to the conditions present in a lead-acid battery. Preferably the glass contains more than about 60% by weight of silica and less than about 35% by weight of alumina, and alkali and alkaline earth metal oxides.

As set forth above, one of the preferred applications for use of the porous substrates is in lead acid batteries. Thus, the substrates can be added directly to the positive active material of a lead acid battery, i.e., the positive electrode to improve battery performance, particularly positive active materiaL utilization efficiency. One particular, unique aspect of the porous substrates is that the substrate is able to provide an internal reservoir for holding sulfuric acid electrolyte required for carrying out the electrochemical reactions in the positive active material. More particularly, the porosity improves overall, high rate performance of the positive active material, i.e. improved utilization efficiency at varying rates of discharge time, including high rates and at short discharge times.

As set forth above, the physical properties of the porous substrates can vary widely. It is preferred that the substrate have sufficientmacro porosity and percent apparent porosity to allow for the utilization of the electrolyte sulfuric acid contained in the pores during discharge of the positive active material and, in addition, that the bulk density be selected to reduce the overall weight of the positive active material while enhancing the overall performance of the battery. In general, the preferable percent apparent porosity can vary from about 40% to about 92%, more preferably, from about 70% to about 90%. The preferred ratio of percent macro porosity to percent micro porosity can vary over a wide range and in general is from about 20% to about 95% macro porosity, more preferably, from about 45% to about 90% macro porosity with the balance being micro porosity. The mean pore diameter, particularly mean macro pore diameter, can vary over a wide range with the utilization of electrolyte during the condition of the discharge of the battery being an important factor i.e.,at high rate discharges, such as cold cranking, high macroporosity is preferred. Preferred mean macro pore diameter is from about 1 micron to about 150 microns, more preferably, from about 5 to about 100 microns or even from about 0.075 micron to about 10 micron and still more preferably from about 0.1 to about 5 microns.

As set forth above, a particularly preferred substrate is a porous particle, i.e. porous support, particularly beads, including spheres, extrudates, pellets, rings, saddles, stars, etc., preferably within the bulk density, macro porosity, micro porosity, apparent percent porosity and surface areas as set forth above. The coated particles can provide improved performance in various applications, particularly, in the positive active material of lead acid batteries. As set forth above, the porous substrate can provide a reservoir for electrolyte sulfuric acid which participates in the electrochemical reaction during discharge of the positive active material. A particularly unique embodiment of the present invention is the use of the porous substrate itself as an additive in the positive active material to provide a reservoir of electrolyte sulfuric acid while providing a light weight additive for incorporation into the positive active material. Such particles are porous and within the ranges as set forth above particularly the preferred ranges. Such porous substrates can be further coated with additional components such as with other surface components, which may improve recharge, i.e. oxidation as well as other conductive components. As set forth above, the porous substrate with or without an additional component provides unexpected improvement in the performance of the positive activematerial, particularly, in the high rate discharge conditions such as cold cranking under lower than ambient temperature conditions.

Another particularly unique embodiment of the present invention is the use of the porous substrate itself as an additive in the negative active material to provide a reservoir of electrolyte sulfuric acid while providing a lightweight additive for incorporation into the negative active material. Such particles are porous and within the ranges as set forth above for the porous substrates particularly the preferred ranges. Such porous substrates can be further coated with additional components such as other surface components which may improve recharge, discharge and/or overall life of the battery, such as conductive components which are stable at the conditions of the negative electrode such as carbon and conductive metals,which coated porous substrates are included within the scope of this invention and the term porous substrate. The porous substrate with or without an additional component provides unexpected improvement in the performance of the negative active material particularly under cold cranking conditions particularly multiple cold cranking under lower that ambient temperature conditions. As set forth above, the porous substrate can provide unexpected improvement in cold cranking typically 0 degrees F. or lower during a series of multiple cold cranking. In addition, the porous substrates in the negative active material can provide for improved active material surface area maintenance and active material morphology maintenance particularly at elevated temperatures such as from about 60–80 degrees C. or higher.

Typically, the porous substrates with or without additional components are incorporated into the positive and negative active material typically at a concentration of up to about 5 wt %, typically up to about 3 wt % basis the active material.

As set forth above, it is preferred that the porous substrate particles have sufficient macroporosity and percent apparent porosity for the utilization of the electrolyte sulfuric acid contained in the pores during discharge of the active material. Further, as set forth above, the preferred mean macropore diameter is from about 0.075 microns to about 10 microns and still more preferably from about 0.1 to about 5 microns. Particularly preferred solid porous particles that exhibit sufficient macroporosity to allow for improved utilization of sulfuric acid electrolyte are silica containing inorganic oxides preferably diatomites particularly those as set forth above and organic based materials particularly polyolefins still more preferably polypropylene.

As set forth above the porous substrates are acid resistant and include a wide variety of materials, including inorganic and organic based materials. The porous substrates can be in a wide variety of shapes, including shapes that are reduced in size during the manufacture of the positive active material, such as in the blending and/or mixing of the porous substrate in positive active material manufacture. It is preferred that the resulting particles if reduced in size maintain porosity parameters within the ranges as set forth above. It is also preferred, that the particles have sufficient stiffness and or resistance to detrimental permanent deformation in order to maintain sufficient porosity for the sulfuric acid in the pores to participate in a number of repetitive discharge and charge cycles, such as greater than 50 cycles or even 100 cycles.

Further unique embodiment of the present invention is the use of a resilient organic porous substrate which resists detrimental permanent deformation maintains sufficient porosity for the sulfuric acid in the pores, has resiliency to be deformed under the conditions of discharge particularly mechanical forces in the active material of the lead acid battery and has resiliency to approach or attain its original geometry upon recharge of the battery. In a lead acid battery, the densities of the active material change i.e. lead at a density of 11.34 gram/cc, lead peroxide at a density of 9.4 grams/cc, (negative and positive plate respectively) change during discharge of the battery to lead sulfate having a density of 6.2 grams/cc i.e. lead sulfate. Upon recharge, the lead sulfate is converted back to lead and lead peroxide in the negative and positive plates respectively. The resilient organic porous substrates have the ability to be deformed during discharge and approach or attain their original geometry during recharge of the battery. The changes in density and the ability of the porous substrate to be deformed allows for increased availability and a greater amount of sulfuric acid from the pores of the substrate as a function of time to participate in a number of repetitive discharge and charge cycles leading to increased utilization efficiency. Typical examples of resilient organic porous substrates are elastomeric or rubber-like porous substrates wherein the pores allow the sulfuric acid to participate in discharge and charge cycles. Further examples of such organic resilient porous substrates are organic polymers including for example organic polymers selected from the group consisting of polyolefins, polyvinyl polymers,-phenol formaldehyde polymers, polyesters, polyvinylesters, cellulose and mixtures thereof. The polymers are selected to be acid resistant and compatible with the active material at the conditions of the electrode in which they are in contact. Various resilient organic porous substrates particularlyporous particles can be produced using suspension polymerization of a dispersed phase consisting of monomers, cross-linking agents, initiators, i.e., catalysts and a co-solvent that functions to aid pore formation. The particle size, pore volume, pore size distribution and macroporosity can be varied within the ranges as set forth above. Such resilient organic porous substrates including particles as set forth above have geometries and are typically used within the ranges as set forth above for the coated porous substrates, particularly the preferred ranges and, as set forth above, as to their use in positive active and negative active material. Depending on the particular active material in which such resilient porous substrates are incorporated, such porous substrates can be further coated with additional components such as with other surface components which may improve overall properties such as discharge, recharge and life of the active materials.

As set forth above, the porous substrates including resilient porous substrates can be incorporated into the positive and negative active material. The various porous substrates provide a reservoir of electrolyte sulfuric acid in the active material. The reservoir of sulfuric acid in the porous substrates can be added to the porous substrate prior to the addition of the porous substrate to the positive and negative active material or incorporated into the porous substrate from the sulfuric acid electrolyte present in the lead acid battery. Further, other liquids such as water can be substituted for sulfuric acid if a liquid is added to the porous substrate prior to the addition of the porous substrate to the active material. As is recognized by those of skill in the art, only liquids which do not have an adverse detrimental effect on the performance of the battery should be added to the porous substrate prior to addition to the active material.

In a still further embodiment and as is set forth above, the porous substrate particles can be coated with another material. One such material is a component which gives hydrophobic character to the porous substrate, i.e. the porous substrate with the component is not water wet to the same degree as without the component. Such change to hydrophobic character can enhance the flow of electrolyte within the active material by limiting the bonding of the active material to the pores present in the porous particles and to particle surfaces. A particularly preferred component is a silica based size having hydrophobic alkyl groups such as methyl, ethyl or isooctyl which provide for hydrophobic character on the surface of the porous particles. Many of the organic porous particles within the scope of this invention have inherent hydrophobic properties such as the polyolefins whereas other have a combination of hydrophilic and hydrophobic properties. As set forth above, it is preferred that the porous particles have sufficient hydrophobic character to reduce the permanent bonding of the active material to the surfaces of the porous particles particularly the pores of the particles. The reduced bonding of the active material to the porous particles allows for improved diffusion of the sulfuric acid electrolyte to the interior of the active material associated with the positive and/or negative plate.

As set forth above, the additives are typically incorporated into the positive and negative active material at a concentration of up to about 5 wt %. The porous particle additives and the antimony inhibiting additives are incorporated during battery manufacture preferably during the production of the paste prior to application on the grid material. The additives can be incorporated into, for example, the lead, leady oxide powders to which the sulfuric acid and water are added. Alternatively, the additives can be mixed into the precursor paste prior to applying on the grid material. It is preferred that the additives be incorporated such as to provide a uniform distribution of the additive particles throughout the entire paste, active material.

Further, the porous substrate as set forth above can be an acid resistant organic material, including organic polymeric materials as set forth above. Preferred polymers are polyolefin polymers, polyvinyl polymers, phenolformaldehyde polymers, polyesters, polyvinylesters and mixtures thereof. Preferred polymers are polyolefins, preferably polypropylene, phenolformaldehyde polymers and polyvinylester, particularly modacrylic polymers.

Certain of these and other aspects of the present invention are set forth in the following examples.

EXAMPLE 1

Negative paste batches are prepared by mixing 10 lbs of a dry Barton mill leady oxide, pasting fibers, an expander comprising an organic expander (a sulfonated lignin), barium sulfate and carbon black at a concentration of 2 wt. % leady oxide at a expander weight ratio of 1.2 wt. % lignosulfonate, 0.4 wt % barium sulfate and 0.4 wt % carbon black basis dry leady oxide and a macroporous cross-linked organic polymer having sulfonic functionality at a concentration of 1.5 wt % basis the dry leady oxide for approximately five minutes. The organic polymer having sulfonic functionality was a 20 wt % divinyl benzene cross-linked polystyrene having sulfonic acid groups present on the aromatic rings. The organic polymer was in the sodium form and had a capacity of 4.3 eq./kg basis dry resin and a median pore diameter of 350 angstroms. A measured quantity of water is added to make the paste precursor and is mixed for a period of time to obtain uniform additive distribution. Pasting acid (1.375 SG) is continuously added to the paste precursor at a rate of from 0.6 to 0.9 ml. per second. For the negative paste mix, the pasting acid is added over 10 to 13 minutes. After acid addition is complete the paste batch is mixed for an additional period of time to allow the temperature to be reduced to about 110° F. The maximum temperature of negative pastbatches ranges from about 165 to about 170° F. Paste moisture and densities are obtained from the paste batches. The pastes are applied to negative grids at a constant thickness as determined by the grid thickness. Following pasting, the plates are cured in curing chambers and positive and negative plates and separator are assembled into 2-volt cells. An improvement in capacity maintenance is obtained.

EXAMPLE 2

The paste making preparation and battery assembly of Example 1 is repeated for a negative active material except The organic polymer had a capacity of 5.2 eq./kg basis dry polymer and a median pore diameter of 650 angstroms. An improvement in capacity maintenance is obtained.

EXAMPLE 3

The paste making preparation and battery assembly of Example 1 is repeated for a negative paste except The organic polymer had a wt % cross-link of 16% and a capacity of 5.0 eq./kg basis dry polymer. An improvement in capacity maintenance is obtained.

EXAMPLE 4

The paste making and battery assemble procedure of Example 1 is repeated except that the organic polymer had an 18% cross-link and a median pore diameter of 300 angstroms. An improvement in capacity maintenance is obtained.

EXAMPLE 5

A high cross-link macroporous polymer additive was incorporated into a negative paste at a concentration of 1.5 wt %. The paste mixture had an initial density of 4.3 g/cc. The additive was a polystyrene cross-linked with divinylbenzene, 16 wt % and had a capacity of 5.0 eq./kg (dry basis) and a median pore diameter of greater than 1,000 angstroms. The negative paste was applied to calcium alloy (0.09%) negative grids. The hand pasted negative plates were used to assemble a five plate flooded electrolyte test cell with polyethylene separators and antimonial alloy (6 wt %)positive grids. The additive had a moisture content of about 37 wt % prior to incorporation into the negative paste. After assembly into a battery, the battery was deep cycled to determine the control of the adverse effects of antimony ion on the negative plate. The results of testing of greater than 100 cycles showed that the detrimental effects of antimony were inhibited on the negative plate when compared to a control without the antimony inhibiting additive.

While this invention has been described with respect to various specific examples and embodiments, it is to be understood that the invention is not limited thereto and that it can be variously practiced within the scope of the following claims.

What is claim for:

1. A battery element useful as a portion of a plate in a lead acid battery comprising active material, sulfuric acid electrolyte and a macroporous high cross-link organic polymer additive having sulfonic functional groups which have a preferential affinity over lead ion for at least one electrolyte soluble metal impurity ion more nobler than lead at the discharge/charge electrochemical conditions of the positive and negative plates provided that at least a portion of said organic polymer is incorporated into said active material and in contact with the metal impurity ion containing electrolyte to allow said ion to permeate the porous polymer.

2. The element of claim 1 wherein the organic polymer is cross-linked to about 14 to about 22 wt %.

3. The element of claim 2 wherein the organic polymer is cross-linked to about 16 to about 20 wt %.

4. The element of claim 2 wherein the organic polymer is polystyrene and the cross-linking is by divinylbenzene.

5. The element of claim 3 wherein the organic polymer is polystyrene and the cross-linking is by divinylbenzene.

6. The element of claim 3 wherein the macroporous organic polymer has a median pore diameter of from about 250 angstroms to about 1,100 angstroms.

7. A battery element useful as at least a portion of a negative plate in a lead acid battery comprising negative active material, sulfuric acid electrolyte and a macroporous high cross-link organic polymer additive having sulfonic functional groups which have a preferential affinity over lead ion for at least one electrolyte soluble metal impurity ion more nobler than lead at the discharge/charge electrochemical conditions of the positive and negative plates provided that at least a portion of said organic polymer is incorporated into said active material and in contact with the metal impurity ion containing elecrolyte to allow said ion to permeate the porous polymer.

8. The element of claim 7 wherein the organic polymer is cross-linked to about 14 to about 22 wt %.

9. The element of claim 8 wherein the organic polymer is cross-linked to about 16 to about 20 wt %.

10. The element of claim 8 wherein the organic polymer is polystyrene and the cross-linking is by divinylbenzene.

11. The element of claim 9 wherein the organic polymer is polystyrene and the cross-linking is by divinylbenzene.

12. The element of claim 9 wherein the macroporous organic polymer has median pore diameter of from about 250 angstroms to about 1,100 angstroms.

13. The element of claim 12 wherein the soluble metal impurity is selected from the group consisting of antimony, cobalt and nickel.

14. A battery element useful as at least a portion of a negative plate in a lead acid battery comprising negative active material, sulfuric acid electrolyte and a macroporous high cross-link organic additive polymer having sulfonic functional groups which have a perferential affinity over lead ion for antimony soluble metal impurity ion at the discharge/charge electrochemical conditions of the postive and negative plates provided that at least a portion of said organic polymer is incorporated into said active material and in contact with the antimony ion containing electrolyte to allow said ion to permeate the porous polymer.

15. The element of claim 14 wherein the organic polymer is cross-linked to about 14 to about 22 wt %.

16. The element of claim 15 wherein the organic polymer is cross-linked to about 16 to about 20 wt %.

17. The element of claim 15 wherein the organic polymer is polystyrene and the cross-linking is by divinylbenzene.

18. The element of claim 16 wherein the organic polymer is polystyrene and the cross-linking is by divinylbenzene.

19. The element of claim 16 wherein the macroporous organic polymer has a median pore diameter of from about 250 angstroms to about 1,100 angstroms.

20. A battery element useful as at least a portion of a negative plate in a lead acid battery comprising negative active material, an expander comprising at least a nonporous sulfonic acid polymeric expander component and a macroporous high cross-link organic polymer additive having sulfonic functional groups provided that at least a portion of said orgainc polymer is incorporated into said negative active material.

21. The element of claim 20 wherein the organic polymer is cross-linked to about 14 to about 22 wt %.

22. The element of claim 21 wherein the organic polymer is cross-linked to about 16 to about 20 wt %.

23. The element of claim 21 wherein the organic polymer is polystyrene and the cross-linking is by divinylbenzene.

24. The element of claim 22 wherein the organic polymer is polystyrene and the cross-linking is by divinylbenzene.

25. The element of claim 22 wherein the macroporous organic polymer has a median pore diameter of from about 250 angstroms to about 1,100 angstroms.

26. A battery element useful as at least a separator in a lead acid battery comprising a separator interposed between a positive and a negative plate of a lead acid battery and in contact with sulfuric acid electrolyte, said separator having a macroporous high cross-link organic polymer additive having sulfonic functional groups which have a preferential affinity over lead ion for at least one electrolyte soluble metal impurity ion more nobler than lead at the discharge charge electrochemical conditions of the postive and negative plates provided that said porous polymer is associated with said separator and in contact with the metal impurity ion containing electrolyte to allow said ion to permeate the porous polymer.

27. The element of claim 26, wherein the organic polymer is cross-linked to about 14 to about 22 wt %.

28. The element of claim 27, wherein the organic polymer is cross-linked to about 16 to about 20 wt %.

29. The element of claim 27, wherein the organic polymer is polystyrene and the cross-linking is by divinylbenzene.

30. The element of claim 28, wherein the organic polymer is polystyrene and the cross-linking is by divinylbenzene.

31. The element of claim 27, wherein the macroporous organic polymer has a median pore diameter of from about 250 angstroms to about 1100 angstroms.

32. The element of claim 30, wherein the macroporous organic polymer has a median pore diameter of from about 250 angstroms to about 1100 angstroms.

33. The element of claim 27, wherein the metal impurity is antimony.

34. The element of claim 29, wherein the metal impurity is antimony.

* * * * *